(12) United States Patent
Mills et al.

(10) Patent No.: US 7,722,960 B2
(45) Date of Patent: May 25, 2010

(54) POLYMERIC FILMS

(75) Inventors: Peter Mills, Wigton (GB); Alasdair McEwen, Wigton (GB); Mike Taylor, Wigton (GB)

(73) Assignee: Innovia Films Limited, Wigton, Cumbria (GB)

( * ) Notice: Subject to any disclaimer, the term of this patent is extended or adjusted under 35 U.S.C. 154(b) by 936 days.

(21) Appl. No.: 10/519,994

(22) PCT Filed: Jul. 17, 2003

(86) PCT No.: PCT/EP03/07774

§ 371 (c)(1),
(2), (4) Date: Sep. 7, 2005

(87) PCT Pub. No.: WO2004/009355

PCT Pub. Date: Jan. 29, 2004

(65) Prior Publication Data

US 2006/0046061 A1  Mar. 2, 2006

(51) Int. Cl.
B32B 27/08 (2006.01)
C08L 23/00 (2006.01)
B05C 5/00 (2006.01)

(52) U.S. Cl. .......................... 428/520; 525/240; 427/445
(58) Field of Classification Search ................. 428/516; 525/240; 427/445
See application file for complete search history.

(56) References Cited

U.S. PATENT DOCUMENTS

| 3,873,735 | A | 3/1975 | Chalin et al. |
| 4,093,342 | A * | 6/1978 | Foord et al. ................. 385/103 |
| 4,294,889 | A | 10/1981 | Hashimoto |
| 4,670,352 | A | 6/1987 | Kurz |
| 4,834,245 | A | 5/1989 | Ohga et al. |
| 4,942,087 | A * | 7/1990 | Motooka et al. ............ 428/332 |
| 5,556,674 | A | 9/1996 | Meilhon |
| 5,630,308 | A | 5/1997 | Guckenberger |
| 5,820,953 | A | 10/1998 | Beer et al. |
| 6,541,123 | B1 * | 4/2003 | Taniguchi et al. ........... 428/520 |

FOREIGN PATENT DOCUMENTS

| EP | 0515825 A | 12/1992 |
| EP | 0 663 285 A | 7/1995 |
| EP | 0 763 422 A | 3/1997 |
| JP | 10 086299 A | 4/1998 |

(Continued)

OTHER PUBLICATIONS

Time Dependent and Nonlinear Effects in Polymers and Composites; Richard A Charpery and C.T. Sun ed. from symposium held May 4-5, 1998 in Atlanta GA; p. 305.*

(Continued)

*Primary Examiner*—Kevin R. Kruer
(74) *Attorney, Agent, or Firm*—Ping Wang; Morris, Manning & Martin, LLP

(57) ABSTRACT

There is described a biaxially oriented polyolefin single or multi-layer film which comprises at least one core layer comprising a propylenic polymer component and either an ethylenic polymer component (preferably 0.2% to 8% by weight of core layer) or a styrenic polymer component (preferably 0.2% to 25% by weight of core layer). The films have a dynamic loss modulus (E"), at 3 Hz and 25° C., of 28 to 136 MPa (TD) and/or 73 to 135 MPa (MD) as well as a dynamic storage modulus (E'), at 3 Hz and 25° C., of 630 to 2800 MPa (TD) and/or 1300 to 3000 MPa (MD). These films are suitable for use as a label facestock with improved conformability for example to provide improved labels for squeezable containers.

16 Claims, 4 Drawing Sheets

(% Shrinkage MD) – Table 7

FOREIGN PATENT DOCUMENTS

| | | | |
|---|---|---|---|
| JP | 2001-151960 A | * | 6/2001 |
| WO | 9814317 A | | 4/1998 |
| WO | 9962987 | * | 5/1998 |
| WO | 0196194 A | | 12/2001 |
| WO | 02 11983 A | | 2/2002 |

OTHER PUBLICATIONS

IDS Packaging-Conformable Biaxially oriented polypropylene; Dr. Mike Taylor.*

Takayanagi, M., Mem. Fac. Eng. Kyushu Univ., 23, No. 1, p. 41. reproduced in part in Ferry, J.D., Visoelastic Properties of Polymers, 3rd ed., Wiley, (1980).

Takayanagi, M., "Crystallized State of Polymer in its Dispersion Behaviour", Pure Appl., Chem., 15, 555, (1967).

Maxwell, B., J. Polym. Sci.: part C, No. 9, p. 52, 1965.

Ferry, J.D., Viscoelastic Properties of Polymers, 3rd ed., p. 42, Wiley, 1980.

* cited by examiner (% Shrinkage MD) – Table 7

(Handle-o-meter results beta setting) – Table 9

Ranking with respect to E' and E" in MD

POLYMERIC FILMS

CROSS REFERENCE TO RELATED APPLICATIONS

This application is a 371 National Stage Application of International Application No. PCT/EP2003/007774, filed Jul. 17, 2003, which claims priority to GB 0216768.2, filed Jul. 19, 2002 and GB 0224289.9, filed Oct. 18, 2002.

BACKGROUND OF THE INVENTION

The present invention relates to films of improved conformability suitable for use as a label on deformable and/or irregular shaped articles (such as a squeezable plastic bottle or graphic art displays).

It is desirable to provide improved polymeric films which conform better to irregular surfaces to which the film may be applied for example when used as a facestock in the label or graphic art fields. Previous films which were highly conformable were often unsuitable for use as labels. To achieve improved levels of conformability required unacceptable compromises on other film properties also desired or necessary in a label. For example conformable labels had unacceptable optical properties e.g. insufficient clarity for a transparent label to achieve a "no-label look".

Certain multi-layer polypropylene films which comprise layers of other copolymers are known.

For example WO 00/54968 (Mobil) describes a multi-layer film with a core layer of syndiotactic polypropylene. Other layers of the film (such as a skin layer and/or a layer adjacent to the core layer of this film) may comprise ethylene copolymers and/or terpolymers containing co-monomers of propylene and butene-1. These films are stated to have advantageous barrier properties for example for packaging applications. They are also described as having "remarkable toughness and resistance to deformation" which teaches directly away from use of such films on conformable substrates.

The present invention provides sheets which address some or all of the previously mentioned problems (for example with conformability) and are particularly suited for uses such as labelling squeezable articles.

Therefore broadly in accordance with the present invention there is provided a biaxially oriented polyolefin single or multi-layer film which comprises at least one core layer comprising a propylenic polymer component and either an ethylenic polymer component or a styrenic polymer component characterised in that the dynamic loss modulus (E") of the film measured at 3 Hz and 25° C. is:

(a) from about 28 to about 136 MPa, preferably about 100 MPa measured in the transverse direction (TD); and/or
(b) from about 73 to about 135, preferably about 100 MPa measured in the machine direction (MD).

The films of the invention are suitable for use as a label on deformable substrates such as squeezable containers (e.g. plastic bottles). Labels of these films can conform with the substrate whilst retaining acceptable other properties. The films can exhibit reduced creasing and visual blemishes after repeated deformation yet can retain acceptable performances of other properties such as good optical performance desired for a transparent label film. The films can if desired be made with balanced properties and/or the core layer can be substantially free of additives which otherwise may have a detrimental effect on other film properties.

It is particularly surprising given the teaching of WO 00/54968 that films of the invention with ethylenic and/or styrenic polymer components have improved conformability.

Broadly in accordance with a further aspect of the present invention there is provided a biaxially oriented polyolefin single or multi-layer film which comprises at least one core layer comprising a propylenic polymer component and either an ethylenic polymer component or a styrenic polymer component characterised by a dynamic storage modulus (E'), measured at 3 Hz and 25° C. of:

(a) from about 630 to about 2800 MPa measured in the transverse direction (TD); and/or
(b) from about 1300 to about 3000 MPa measured in the machine direction (MD).

Optionally films of the invention have the values given herein for both dynamic loss modulus (E") and for dynamic storage modulus (E')

Broadly in accordance with a yet further aspect of the present invention there is provided a biaxially oriented polyolefin single or multi-layer film which comprises at least one core layer comprising a propylenic polymer component and either (x) from about 0.2% to about 8% of an ethylenic polymer component; or
(y) from about 0.2% to about 25% of a styrenic polymer component; by weight of the core layer.

The ethylenic polymer component is preferred.

Preferably the films of the invention are substantially transparent and/or have other acceptable optical properties such as haze (wide or narrow angle) gloss etc, for use as a clear transparent label to produce a no-label look.

In a further aspect of the present invention there is provided a method of selecting those polymeric films which are of improved conformability suitable for labelling a deformable and/or irregular shaped article to having reduce blemishing thereon during use; the method comprising the steps of:

(a) preparing polymeric (preferably polyolefin) film comprising at least one core layer comprising a copolymer formed from at least propylene and ethylene monomers
(b) measuring at 3 Hz and 25° C. in the MD and/or the TD, the dynamic loss modulus (E") and/or the dynamic storage modulus (E') of the film;
(c) selecting those films for use in labelling (optionally as a label facestock) which have at least one of the following properties:
  (i) E" in the TD from about 20 to about 150 MPa;
  (ii) E" in the MD from about 70 to about 150 MPa;
  (iii) E' in the TD from about 600 to about 3000 MPa; and/or
  (iv) E' in the MD from about 1300 to about 3000 MPa.
(d) optionally applying a film selected from step (c) as a label to a squeezable article.

Conveniently films of and/or used in the present invention may exhibit the following values:
(i) E" in the TD from about 28 to about 136 MPa;
(ii) E" in the MD from about 73 to about 135 MPa;
(iii) E' in the TD from about 630 to about 2800 MPa; and/or
(iv) E' in the MD from about 1300 to about 3000 MPa.

More conveniently films of and/or used in the present invention exhibit the following values:
(i) E" in the TD of from about 56 to about 124 MPa,
(ii) E" in the MD of from about 76 to about 122 MPa,
(iii) E' in the TD of from about 920 to about 2430 MPa, and/or
(iv) E' in the MD of from about 1325 to about 2390 MPa.

Most conveniently films of and/or used in the present invention exhibit the following values:
(i) E" in the TD of from about 80 to about 111 MPa,
(ii) E" in the MD of from about 80 to about 108 MPa, (iii) E' in the TD of from about 1320 to about 2060 MPa, and/or (iv) E' in the MD of from about 1350 to about 2175 MPa.

Specific films which may be of and/or used in the present invention exhibit the following values:

E" (TD)≈90 MPa; E" (MD)≈94 MPa; E' (TD)≈1360 MPa; & E' (MD)≈1470 MPa;

E" (TD)≈87 MPa; E" (MD)≈89 MPa; E' (TD)≈1280 MPa; & E' (MD)≈1560 MPa; and/or

E" (TD)≈84 MPa; E" (MD)≈90 MPa; E' (TD)≈1340 MPa; & E' (MD)≈1580 MPa.

DETAILED DESCRIPTION OF THE INVENTION

Figure 1:
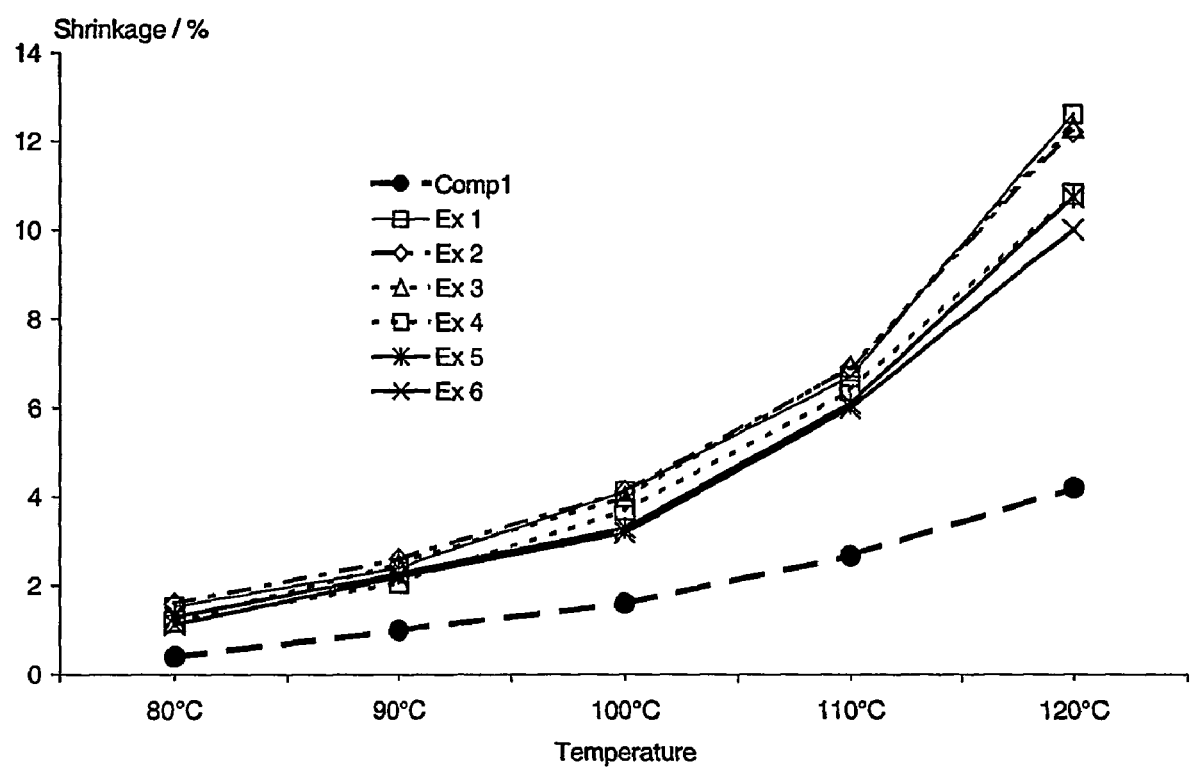
FIG. 1 shows the % shrinkage MD—Table 7.

As used herein the term squeezable will be understood to mean any substrate or article which can be readily deformed by application of force from a person during use for example when a bottle is grasped and squeezed to dispense its liquid contents. Preferably for a squeezable substrate such deformation is substantially reversible.

The meaning of all the polymer terms used herein (such as homopolymer, random copolymer block copolymer, bipolymer, terpolymer etc) are well known to those skilled in the art and for example are defined in IUPAC Compendium of Chemical Terminology (2$^{nd}$ Edition 1997). As used herein a polymer component may mean the polymer is present as a homopolymer (optionally in physical mixture with another polymer) or as part of a copolymer formed from the appropriate monomer.

The core layer may comprise: a blend of propylene and ethylene homopolymers; a blend of propylene with a saturated styrenic block copolymer; and/or a co-polymer formed from at least propylene and ethylene monomers.

Preferably the copolymers used herein are those obtained and/or obtainable from two monomers (bipolymer) and/or three monomers (terpolymers).

Dynamic mechanical thermal analysis (DMTA) is a technique employed to characterise materials in terms of their modulus, elasticity, viscosity, damping behaviour and relaxation phenomena (such as glass transition temperature). Each of these parameters can be monitored as a function of strain, rate of strain, temperature and oscillating frequency.

In a DMTA test, an oscillating strain (typically sinusoidal) is applied to a sample and the resulting stress developed in the sample is measured. For a linear viscoelastic material (such as polypropylene film under the testing regime employed here), the stress and strain will both vary sinusoidally, but the stress and strain will be out of phase with respect to each other. The stress signal can then be separated into two components; an elastic stress which is in phase with the strain and a viscous stress, which is 90° out of phase with the strain. The stress-strain relationship can therefore be defined by a modulus E' which is in phase with the strain and a quantity E" which is 90° out of phase. Because it is in phase with the strain E' is often called the storage modulus because it defines the energy stored in the specimen due to the applied strain. The modulus E" which is out of phase defines the dissipation of energy and is often called the loss modulus.

Unless otherwise indicated the DMTA data obtained herein was measured at 25° C. and at a frequency of 3 Hz and all moduli were given in units of MPa.

The core layer is preferably self supporting. Although the film may be single ply (i.e. where the core layer is the only layer) the film may also be multi-layered—i.e. where the film also comprises at least one additional layer adjacent to the core layer.

Preferably the co-polymer in the core layer is selected from: a random and/or block copolymer (e.g. a bipolymer and/or terpolymer) optionally comprising up to about 50% of PE.

More preferably the core layer comprises one of:
a) a blend of PP homopolymer and a PP/PE random bipolymer;
b) a blend of PP homopolymer and a PP/PE block bipolymer;
c) a blend of PP homopolymer and a PP/PE/PB terpolymer
d) a terpolymer of PP, PE and polybutylene (PB);
e) a blend of a PP/PE random bipolymer and a PP/PE block bipolymer.
f) a PP/PE random bipolymer;
g) a PP/PE block bipolymer; and/or where in the bipolymers or terpolymers the PE comprises up to about 50% by weight.

Usefully the core layer consists of
(i) from 0% to 100% by weight of (i) a PP/PE random bipolymer; and
(ii) from 100% to 0% by weight of (ii) a PP/PE block bipolymer;
(iii) from 0% to 10% of other known suitable additives (such as antioxidant etc).

More usefully the core layer is substantially free of additives and:
(ii) the PP/PE block bipolymer is present in an amount from 0% to about 60%, for example 0%, 18.5%, 27.5%, 36.9% or 53.0% by weight of the layer (which is a blend between the block and random bipolymers only)

PP/PE random and/or block copolymers may comprise any proportion of the constituent PE or PP components. Preferred PP/PE random copolymers comprises from about 0.2% to about 5%, more preferably about 3.5% by weight of PE. Preferred PP/PE block copolymers comprise from about 5% to about 50%, more preferably from about 5% to about 12% most preferably about 7.5% by weight of PE.

Suitable additives can be selected from one or more of the following, mixtures thereof and/or combinations thereof: UV stabilisers, UV absorbers, dyes; pigments, colorants; metallised and/or pseudo-metallised coatings; lubricants, anti-static agents (cationic, anionic and/or non-ionic, e.g. poly-(oxyethylene) sorbitan monooleate), anti-oxidants, surface-active agents, stiffening aids, slip aids (for example hot slip aids or cold slip aids which improve the ability of a film to slide satisfactorily across surfaces at about room temperature, e.g. microcrystalline wax; gloss improvers, prodegradants, barrier coatings to alter the gas and/or moisture permeability properties of the film (such as polyvinylidene halides, e.g. PVdC); anti-blocking aids (for example microcrystalline wax, e.g. with an average particle size from about 0.1 to about 0.6 μm); tack reducing additives (e.g. fumed silica); particulate materials (e.g. talc); additives to reduce coefficient of friction (COF) (e.g. terpolymers of about 2 to 15 weight % of acrylic or methacrylic acid, 10 to 80 wt. % of methyl or ethyl acrylate, and 10 to 80 weight % of methyl methacrylate, together with colloidal silica and carnauba wax, as described in U.S. Pat. No. 3,753,769); sealability additives; additives to improve ink adhesion and/or printability; cross-linking agents (e.g. melamine formaldehyde resin); adhesive layers (e.g. a pressure sensitive adhesive); and/or an adhesive release layer (e.g. for use as a liner in peel plate label applications).

Some or all of the additives listed above may be added together as a composition to coat the films of the present invention and/or form a new layer which may itself be coated and/or may form the outer or surface layer of the sheet. Alternatively some or all of the preceding additives may be added separately and/or incorporated directly into the bulk of the core layer optionally during film formation (e.g. as part of the original polymer composition), and thus they may or may not form layers or coatings as such. If the core layer is the only layer (i.e. the film of the invention is a single ply film) then the additives included may be those (such as some of those listed herein) more suitable for a surface layer of a film.

The PP-PE bipolymers used herein may comprise a polymer chain in which the polypropylene and ethylene units are distributed in accordance with random statistics with no preference for long sequences of one or other unit. The PP-PE bipolymers may also comprise linked homogenous blocks formed largely from one of the propylene or ethylene monomers. The bipolymers are conveniently prepared by simultaneously feeding propylene and ethylene in the desired proportions to a catalysed polymerisation zone in a polymerisation reactor.

The polymers used in the core layer herein can be made by any conventional method such as Ziegler-Natta catalysis or metallocene catalysis.

The film of the invention can be a single layer of the core layer as described herein. However, it is preferred that films of the present invention sheets are multi-layered, i.e. consist of a plurality of layers. The layers can be combined by lamination or co-extrusion. More preferably the sheets consist of at least three layers where the or each core layer is sandwiched between other layers such that none of the core layers forms either outer surface of the sheets.

Films of the invention can also be made by the laminating of two co-extruded films. Application of the outer layer(s) onto the core layer is conveniently effected by any of the laminating or coating techniques conventionally employed in the production of composite multi-layer films. Preferably, however, one or more of the outer layers are applied to the substrate by a co-extrusion technique in which the polymeric components of the core and outer layers are co-extruded into intimate contact while each is still molten. Preferably, the co-extrusion is effected from a multi-channel annular die so designed that the molten polymeric components constituting individual layers of the composite film merge at their boundaries within the die to form a single composite structure which is then extruded from a common die orifice in the form of a tubular extrudate. It will be appreciated that any other shape of suitable die could also be used such as a flat die.

For example, a film of the invention can have three layers with the polymer of a central or core layer being formed from the second polymeric material. The core layer may have a thickness of about 90% to about 98% of the total thickness of the film. The remainder of such three layer films can then have two outer layers of the first polymeric material, with each outer layer having substantially identical thicknesses.

Other films of the present invention consist of five co-extruded layers with a central core layer, two layers contiguous to the central core layer and two outermost layers, where the central core layer and such contiguous layers include the second polymeric material and the two outer layers are formed from the first polymeric material. Preferably the central core layer has a thickness from about 70% to about 96%, more preferably from about 76% to about 90%, of the total thickness of the film. Preferably each of such contiguous layers has substantially the same thickness, which is more preferably from about 1% to about 6%, and most preferably from about 1% to about 2%, of the total thickness of the film. Preferably each outer layer has substantially the same thickness, which is more preferably from about 1% to about 6%, and most preferably from about 1% to about 2%, of the total thickness of the film.

One or more of layers of films of the present invention can be opaque or transparent, depending on the end use of the film. Such layers can also include voids introduced by stretch orienting a layer containing particles (preferably substantially spherical particles) of a material which is higher melting than and immiscible with the layer material (e.g. if the layer is formed from isotactic polypropylene homopolymer, such particles can be of polybutylene terephthalate, as described, for example, in U.S. Pat. No. 4,632,869 and U.S. Pat. No. 4,720,716).

The polymers of the outer layers (i.e. non core layer or layers) of the film can also be fabricated from suitable any polymers, copolymers or terpolymers or blends of homopolymers and blends of copolymer(s) and homopolymer(s) which provide the desired properties to these outer layers. It will be appreciated that such outer layers are preferably made from materials selected to have the same or more conformability than the core layer so that the overall conformability of the film is not reduced by the presence of the outer layers. As the outer layers need not be self supporting as they are supported by the core layer there are less constraints on their composition compared to the core layer.

Suitable outer layers comprise isotactic propylene homopolymers, or for example, a copolymer of propylene with a minor amount of one or more other $\alpha$-olefins, such as ethylene and/or butylene-1 and/or other suitable terpolymers known in the art.

The polymeric film of the invention is oriented by stretching at a temperature above the glass transition temperature of the polymer(s). For example, orientation of a film having a propylene homopolymer substrate layer is conveniently effected at a temperature within a range of from about 145 to 165° C. Biaxial orientation is effected by stretching the film in each of two mutually perpendicular directions in the plane of the film. The biaxial orientation may be balanced or unbalanced, for example with the higher degree of orientation of an unbalanced film in a preferred direction—usually the transverse direction. A balanced biaxially oriented film is preferred.

Conveniently, the material which forms the core and outer layers are co-extruded in the form of a composite tube which is subsequently quenched, reheated, and then expanded by internal gas pressure to induce transverse orientation, and withdrawn, at a rate greater than that at which it is extruded, to stretch and orient it in the machine direction. Alternatively, a flat, multiple-layer film may be oriented by simultaneous or sequential stretching in each of two mutually perpendicular directions by means of a stenter, or by a combination of draw rolls and a stenter.

The degree to which the film substrate is stretched depends to some extent on the ultimate use for which the film is intended, but for a propylene polymer-based film satisfactory tensile and other properties are generally developed when the film is stretched to between three and ten, preferably, five to eight, times its original dimensions in each of the transverse and longitudinal directions. A preferred advantage of films of the present invention is that biaxial orientation (which acts to make the film more stiff in the oriented direction) can be achieved in a film with acceptable conformability.

After stretching, the polymeric film may be thermally treated, for example, by a system of one or more heated rollers, as disclosed, for example, in GB-A-1124886. The aforementioned thermal treatment is preferably at a temperature in the range from 40° to 130° C. Alternatively, or additionally, the film may be subjected to a constrained heat treatment of the kind described in EP-A-23776.

Polymeric films in accordance with the invention may be prepared in a range of thicknesses governed primarily by the ultimate application for which a particular film is to be employed and may for example have a total thickness in a range from about 2.5 microns to about 120 microns.

The films of the invention may have substantially balanced properties. In preferred films the E' values are substantially the same in the MD and TD, and/or the E" values are substantially the same in the MD and TD. More preferably the film has isotropic dynamic moduli (E' & E") (most preferably isotropic mechanical properties; for example isotropic physical properties) in all directions parallel to the film surface. One method to prepare balanced oriented films is the blown bubble process as described herein.

The films of the present invention may be used as facestock film for label and/or graphic art applications in combination with any suitable conventional surface treatments, other facestocks, primer layers, adhesives, release layers, liners and/or back treatment compatible and/or suitable for use with the films of the present invention as would be well known to a person skilled in the field of labels, film converting and/or graphic arts.

Further aspects, embodiments and/or preferred features of the present invention are given in the claims.

Figure 2:
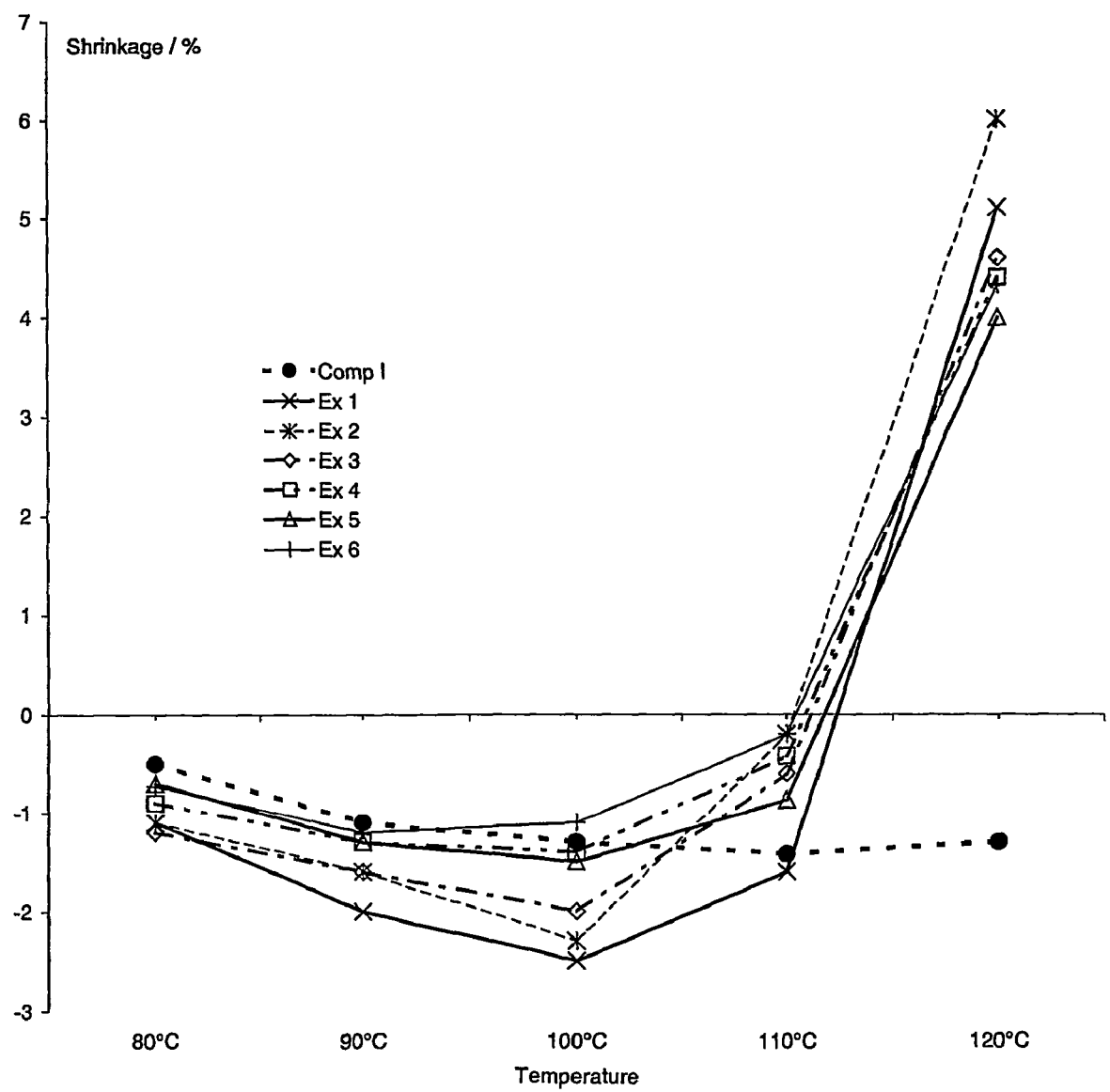
FIG. 2 shows the % shrinkage TD—Table 8.
Figure 3:
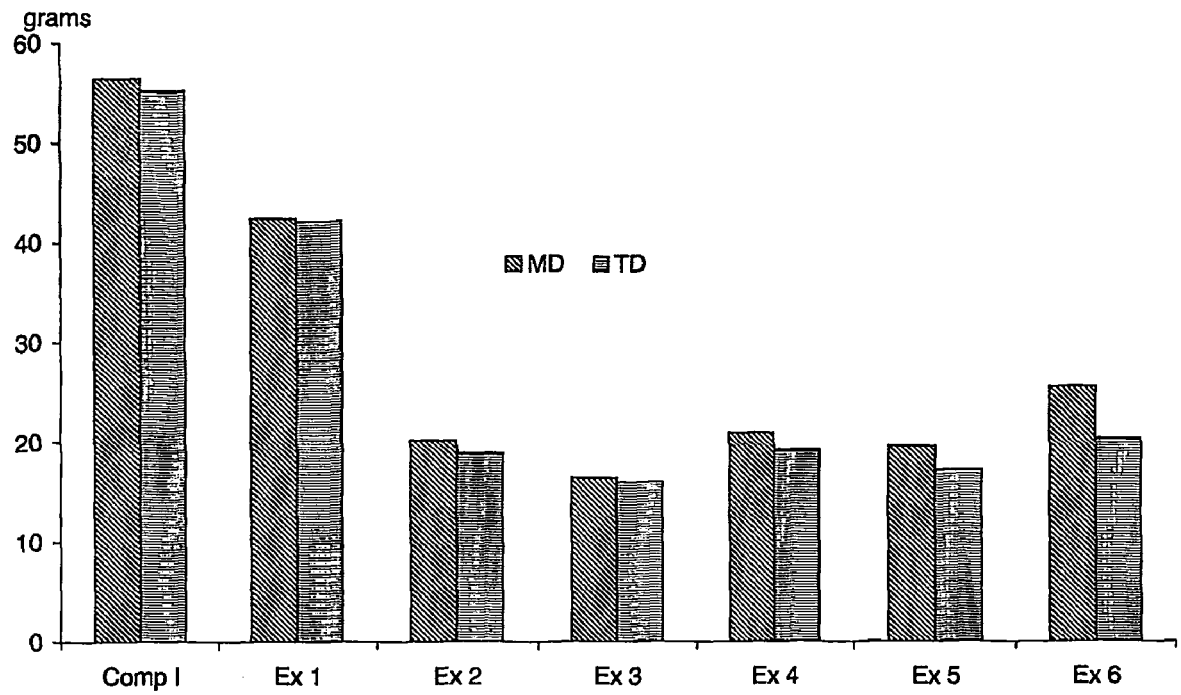
FIG. 3 shows Handle-o-meter results beta testing—Table 9.

The invention is illustrated by some non limiting Figures herein where:

FIG. 1 is a plot of percentage shrinkage results of films in the MD versus temperature, (data given in Table 7);

FIG. 2 is a plot of percentage shrinkage results of films in the TD versus temperature (data given in Table 8); and FIG. 3 is a plot of Handle-o-meter results of films at the "beta" setting (data given in Table 9).

Figure 4:
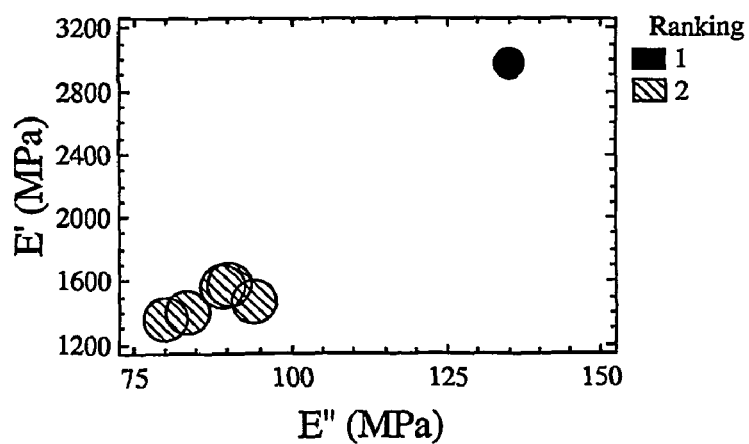
FIG. 4 shows ranking with respect to E' and E" in MD.
Figure 5:
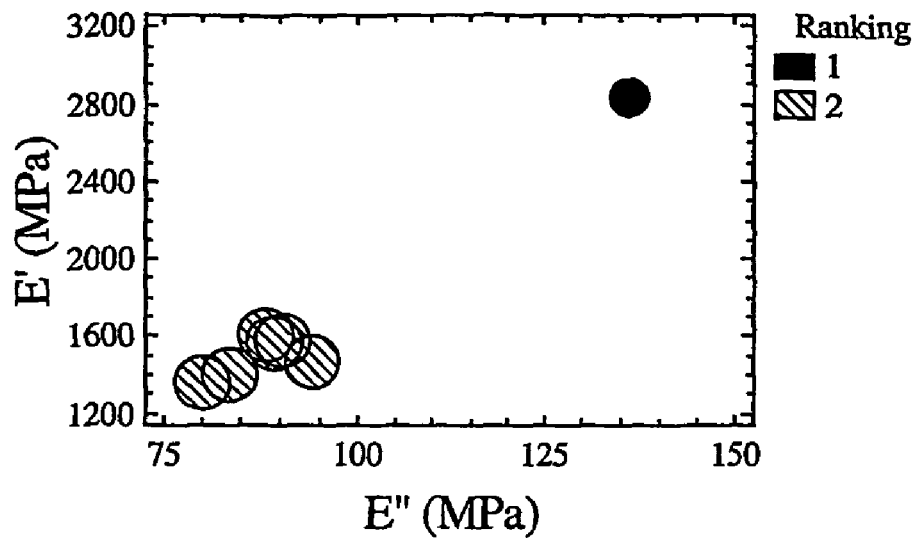
FIG. 5 shows ranking with respect to E' and E" in TD.
Figure 6:
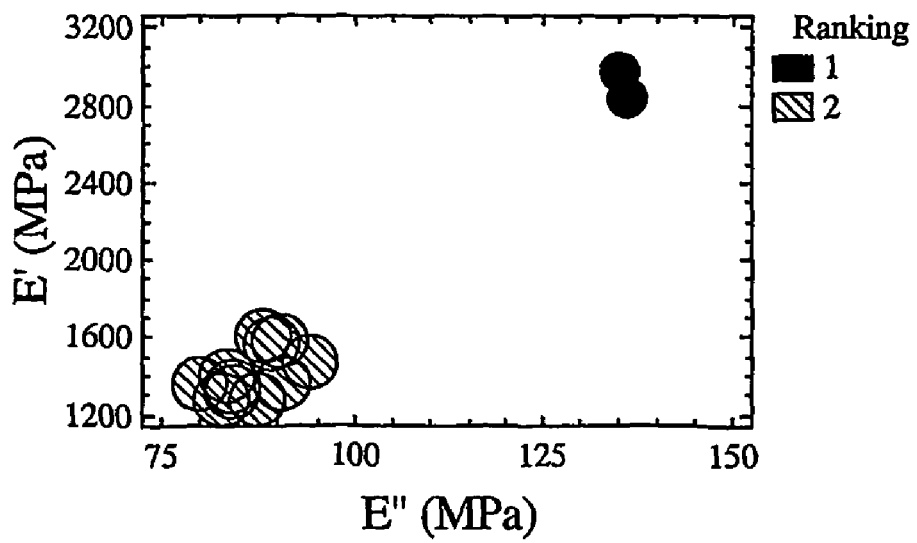
FIG. 6 shows ranking with respect to E' and E" in MD and TD.

FIGS. 4 to 6 are plots of storage modulus (E' in MPa) and loss modulus (E" in MPa) versus the overall performance rank for a comparison film and those of the invention.

The invention is further illustrated by reference to the following Examples, which are by way of illustration only and are not limiting to the scope of the invention described herein. In the Examples, a five layered laminated BOPP film is prepared by a bubble process as follows.

Bubble Process

A film is formed by the coextrusion of three compositions through a triple channel annular die. A polypropylene composition (denoted as Composition A) from the middle channel of the die forms the core layer of the bubble, the composition in the outermost channel of the die forms the exterior surface of the bubble (denoted as composition B), and the composition from the inner channel forms the interior surface of the bubble (denoted as composition C).

As the three compositions are coextruded, air is blown through the die to form a tubular bubble which is cooled by passage over a mandrel within the tube, and it is externally quenched by passage through a water bath surrounding the mandrel. The tube is then heated to stretching temperature, expanded by internal gas pressure to form the bubble, and withdrawn from an expansion zone at a rate greater than that at which it is fed thereto, so that the bubble is stretched to seven times its original dimensions in both the direction of extrusion (MD) and in a direction transverse thereto (TD). The stretched tubular film is then collapsed whilst being heated, thereby forming a flat laminated film which is subsequently heat-set at a suitable temperature to stabilise the film for example using a matt-surfaced roller heat-setter (e.g. of the kind described in GB1124886-A).

The resultant five layered film consists of two three layered films laminated together by layers of Composition C on the interior of the bubble to form a core layer surrounded by two identical layers of Composition A and two identical outer layers of composition B which form the two outer surfaces of the film. Thus the films formed by this method have a B/A/C/A/B layered structure, the film strictly speaking being a six layer film since the inner core layer formed from Composition C is formed by laminating two such layers together.

In the following examples, the outer layer of Composition B which forms the outer surface of the film has a mean thickness of from about 0.3 microns (μm). to about 0.6 microns (μm); and the central laminated inner layer of composition C has a mean thickness of from about 0.7 microns (μm). to about 1.2 microns (μm). The core layer of Composition A forms the rest of the thickness of the film.

All films tested herein had a total thickness of 50 microns (μm).

The particular BOPP films made and tested herein were prepared by the bubble process as described above, where Composition B was a propylene (95% w/w)/ethylene (5% w/w) copolymer; and Composition C was a propylene (82% w/w)/ethylene (1% w/w)/butylene-1 (17% w/w) terpolymer of low crystallinity.

It will be appreciated that other Examples (not necessarily tested herein) could be carried out by replacing any of Compositions A to C by other suitable compositions without departing from the scope of the present invention. For example Composition A could be replaced by a polymer of polypropylene containing a small concentration (from about 0.5% to about 3.0% w/w) of polyethylene, and/or Composition B could be replaced by a propylene (92% w/w)/ethylene (4% w/w)/butylene-1 (4% w/w) terpolymer.

Examples 1 to 6 and Comp I

Films of the invention were prepared as described herein where:

In a Comparative Example I (hereinafter Comp I) the core layer Composition A was a stabilised polypropylene homopolymer suitable for film production with a melt flow index (MFI) measured at 230° C. and 2.16 kg of about 6.5 to about 9.0.

In Examples 1 to 6 of the present invention the core layer Composition A was a polymer blend of (100-'x') % of a PP/PE random copolymer (with 3.5% PE) and 'x' % of a PP/PE block copolymer (similar proportion of PE) as described in Table 1.

TABLE 1

| Example | 1 | 2 | 3 | 4 | 5 | 6 |
|---------|---|---|---|---|---|---|
| 'x' % | 0 | 10.0 | 18.5 | 27.5 | 36.9 | 53.0 |

Results

At each stage the bubble was allowed to settle and samples were taken. The films were tested after conditioning at standard laboratory conditions, and the results obtained are given below: The results are for DMTA measurements at 3 Hz frequency.

DMTA Results

DMTA is the test method described herein and the following results were obtained for E" (loss modulus) in MPa from a conventional DMTA apparatus using the method specified by the manufacturer of the apparatus, measured at a temperature of 25° C.

TABLE 2

| | E" (dynamic loss modulus in MPa) | |
|---|---|---|
| Frequency | TD 3 Hz | MD 3 Hz |
| Comp 1 | 136.1 | 135.2 |
| Ex 1 | 90.44 | 94.19 |
| Ex 2 | 84.34 | 79.91 |
| Ex 3 | 82.76 | 83.58 |
| Ex 4 | 87.27 | 89.19 |
| Ex 5 | 84.19 | 90.27 |
| Ex 6 | 82.01 | 88.18 |

Optical Results (Gloss, NAH, WAH)

Specular gloss is defined as the ratio of the luminous flux reflected from, to that incident on, the specimen for specified solid angles at the specular direction, i.e. the angles of incidence and reflection are equal. The angle used is 45°. Test method is based on ASTM D2457.

The Narrow Angle Haze (NAH) of a specimen is the parallel light which is scattered by more than 6 minutes (0.1°) of arc when passing through the film sample from the incident beam, and is measured in a conventional well known manner as a percentage of the total light transmitted through the film.

The Wide Angle Haze (WAH) of a specimen is the percentage of transmitted light which, in passing through the specimen, deviates from the incident beam by more than 2.5 degrees by forward scattering. It is measured using a test method described in ASTM D1003. The results are given in table 3.

TABLE 3

| | Comp I | Ex 1 | Ex 2 | Ex 3 | Ex 4 | Ex 5 | Ex 6 |
|---|---|---|---|---|---|---|---|
| Gloss (no units) | | | | | | | |
| Side 1 | 96.5 | 83.7 | 85.5 | 82.3 | 80.8 | 79.8 | 76 |
| Side 2 | 95.9 | 83.7 | 85.9 | 82.5 | 80.2 | 79.7 | 76.4 |
| NAH (%) | 4 to 7 | 6 to 9 | 3 to 5 | 8.8 to 10.0 | 14.5 to 16 | 17 to 19 | 21 to 23 |
| WAH (%) | 2.6 | 3.5 | 2.7 | 3.7 | 4.3 | 4.3 | 5.4 |

It can be seen from the results that the conformable films of the invention (Examples 1 to 6) show acceptable optical properties for a conventional BOPP label film (Comp I).

Other Mechanical Results

Tensile strength, elongation to break and modulus (Young's Modulus) were measured using the test method described in National Standard ASTM D882 (1989). The results are given in Tables 4 to 6 that follow.

TABLE 4

| | | Comp I | Ex 1 | Ex 2 | Ex 3 | Ex 4 | Ex 5 | Ex 6 |
|---|---|---|---|---|---|---|---|---|
| Tensile Strength (MPa) | MD | 224.7 | 167.6 | 168.9 | 180.4 | 161.4 | 170.6 | 153.8 |
| | TD | 194.6 | 177.2 | 156.5 | 159.8 | 146.8 | 152.8 | 142.2 |

TABLE 5

| | | Comp I | Ex 1 | Ex 2 | Ex 3 | Ex 4 | Ex 5 | Ex 6 |
|---|---|---|---|---|---|---|---|---|
| Elongation (%) | MD | 82.67 | 78.6 | 89.19 | 114.1 | 84.13 | 97.97 | 86.8 |
| | TD | 106.3 | 147 | 119.9 | 121.4 | 118.2 | 140.8 | 118.3 |

TABLE 6

| | | Comp 1 | Ex 1 | Ex 2 | Ex 3 | Ex 4 | Ex 5 | Ex 6 |
|---|---|---|---|---|---|---|---|---|
| Young's Modulus (MPa) | MD | 1661 | 686.5 | 798.3 | 733.3 | 830.4 | 789 | 812.3 |
| | TD | 1399 | 317.7 | 482.4 | 431 | 453.6 | 380 | 423.3 |

Shrinkage

The shrinkage test is designed to measure the thermal stability of the film and gives an indication of the films likely performance. Two test strips were cut from the centre of the sample film with their longest axis parallel to respectively the TD and the MD of the film each film spaced 25 cm apart in both the TD and MD. The shrinkage was calculated as $(A-B) \times 100/A = \%$ shrinkage where A is the original length of the sample at room temperature (23° C.) and B is the length after being held in the oven for 1 minute at the specified temperature. An expansion is expressed as a negative shrinkage. The two samples were heated at the same time to measure TD and MD shrinkage under the same conditions. The following results were obtained.

TABLE 7

| | Shrinkage (%) in MD after 1 min at specified temperatures | | | | | | |
|---|---|---|---|---|---|---|---|
| Temp | Comp 1 | Ex 1 | Ex 2 | Ex 3 | Ex 4 | Ex 5 | Ex 6 |
| 80° C. | 0.4 | 1.53 | 1.6 | 1.2 | 1.2 | 1.3 | 1.13 |
| 90° C. | 1 | 2.4 | 2.6 | 2.5 | 2.07 | 2.27 | 2.2 |
| 100° C. | 1.6 | 4.13 | 4.13 | 4 | 3.7 | 3.3 | 3.2 |
| 110° C. | 2.67 | 6.7 | 6.9 | 6.93 | 6.4 | 6.1 | 6 |
| 120° C. | 4.2 | 12.6 | 12.2 | 12.3 | 10.8 | 10.73 | 10 |

These results are plotted graphically in FIG. 1 herein

TABLE 8

| | Shrinkage (%) in TD for 1 min at specified temperatures | | | | | | |
|---|---|---|---|---|---|---|---|
| Temp | Comp I | Ex 1 | Ex 2 | Ex 3 | Ex 4 | Ex 5 | Ex 6 |
| 80° C. | −0.5 | −1.1 | −1.1 | −1.2 | −0.9 | −0.7 | −0.73 |
| 90° C. | −1.1 | −2 | −1.6 | −1.6 | −1.3 | −1.3 | −1.2 |
| 100° C. | −1.3 | −2.5 | −2.3 | −2 | −1.4 | −1.5 | −1.1 |
| 110° C. | −1.42 | −1.6 | −0.2 | −0.6 | −0.42 | −0.87 | −0.2 |
| 120° C. | −1.3 | 5.1 | 6 | 4.6 | 4.4 | 4 | 4.33 |

These results are plotted graphically in FIG. 2 herein

Handle-O-Meter

The Handle-O-Meter test method used is described in: Thwing-Albert Handle-O-Meter Tester User Manual 1992 and also in the test standard IST 90.3-95 for the use of a Handle-O-Meter (fabric industry standard).

TABLE 9

| Setting | Comp I | Ex 1 | Ex 2 | Ex 3 | Ex 4 | Ex 5 | Ex 6 |
|---|---|---|---|---|---|---|---|
| alpha | n/m | n/m | 65.3 | 50.4 | 57.4 | 58.3 | 64 |
| beta | 55.9 | 42.2 | 19.2 | 16.2 | 19.8 | 18.4 | 22.9 |
| beta (MD) | 56.5 | 42.4 | 20.1 | 16.4 | 20.9 | 19.6 | 25.5 |
| beta (TD) | 55.3 | 42.1 | 18.9 | 16 | 19.2 | 17.2 | 20.3 |

Note: n/m = not measurable

These results are plotted graphically in FIG. 3 herein

The Handle-O-Meter settings are denoted alpha and beta where alpha denotes 100 g bar, 10 mm gap, Teflon Plates; and beta denotes 100 g bar, 20 mm gap, Teflon Plates. Results are in grams.

Other

The Examples were also evaluated visually as follows. The film was applied as a label in a conventional manner to a squeezable bottle. The labelled bottle was squeezed and allowed to return to its "natural" shape and this cycle was repeated. After several such cycles the visual appearance of the label on the bottle was examined for blemishes such as creasing. Fewer blemishes indicate that the film was better able to conform to the changing surface of the bottle during squeezing. In these tests films of the invention (Examples 1 to 6) were evaluated consistently to have less blemishes (i.e. more conformable) that the conventional film Comp I.

More label samples were prepared analogously to the examples described herein and the performance of the labels was ranked using the above criteria (where rank "1" denoted a poorer performance than rank "2"). It can be seen from FIGS. 4 to 6 that the labels of the invention (Examples 1 to 6—data plotted as cross-hatched circles in these Figures) each had a similar performance and were all ranked higher than Comp I (data plotted as solid circles).

The films tested were unbalanced films where the film properties were not the same in the TD and MD. Thus deformation parameters E' and E" were measured for both the MD and TD for each film tested although each sample was given only one rank based on its combined performance in both the TD and MD. The results are plotted in FIGS. 4 to 6 herein.

FIGS. 4 to 6 are a plot of the storage modulus (ordinate; E' in MPa) versus loss modulus (abscissa, E" in MPa) for Comp I and Examples 1 to 6 (abscissa). The E' v E" data measured in the MD (FIG. 4) and in TD (FIG. 5) are plotted separately and also the data is plotted together (both MD & TD) in a single plot (FIG. 6).

The relative rank of the performance of the labels tested was found to correspond with the relative values of the two parameters of loss modulus (E") and storage modulus (E') when measured in the TD and MD.

The invention claimed is:

1. A polyolefin single or multi-layer film, comprising at least one core layer comprising:
    (a) a polypropylenic (PP) component; and
    (b) a polyethylenic (PE) component or a polystyrenic (PS) component,
    wherein a dynamic loss modulus (E"), measured at 3 Hz and 25° C., from about 28 MPa to about 136 MPa in the transverse direction (TD) and/or from about 73 MPa to about 135 MPa in the machine direction (MD),
    and a dynamic storage modulus (E'), measured at 3 Hz and 25° C., from about 630 MPa to about 2800 MPa in the TD and/or from about 1300 MPa to about 3000 MPa in the MD.

2. The polyolefin single or multi-layer film of claim 1, wherein said at least one core layer comprising said PP component and said PE component, and wherein the PE component is from about 0.2% to about 8% by weight of the core layer.

3. The polyolefin single or multi-layer film of claim 1, wherein said at least one core layer comprising said PP component and said PS component, and wherein said PS component is from about 0.2% to about 25% by weight of the core layer.

4. The polyolefin single or multi-layer film of claim 1, wherein said core layer comprising comprises:
    (i) a blend of PP homopolymer and PE homopolymer;
    (ii) a blend of PP homopolymer and a PP/PE random copolymer;
    (iii) a blend of PP homopolymer and a PP/PE block copolymer;
    (iv) a blend of PP homopolymer and a PP/PE/PB terpolymer;
    (v) a blend of a PP/PE random copolymer and a PP/PE block copolymer; or
    (vi) a blend of PP with a saturated styrenic block copolymer.

5. The polyolefin single or multi-layer film of claim 4, wherein said PP/PE random copolymers comprises from about 0.2% to about 5% by weight of PE.

6. The polyolefin single or multi-layer film of claim 4, wherein said PP/PE block copolymers comprises from about 5% to about 50% by weight of PE.

7. The polyolefin single or multi-layer film of claim 6, wherein said PP/PE block copolymers comprises from about 5% to about 12% by weight of PE.

8. The polyolefin single or multi-layer film of claim 1, wherein said core layer comprising a blend of a PP/PE random bipolymer and a PP/PE block biopolymer, wherein said PP/PE block biopolymer is present in an amount from 0% to 60% by weight of the layer.

9. The polyolefin single or multi-layer film of claim 1, wherein said E' is substantially the same in the MD and TD.

10. The polyolefin single or multi-layer film of claim 1, wherein said E" is substantially the same in the MD and TD.

11. The polyolefin single or multi-layer film of claim 1, wherein each of said E' and E" is substantially the same in the MD and TD.

12. The polyolefin single or multi-layer film of claim 1, wherein said film is biaxially oriented by stretching the film between three and ten times its original dimensions in each of the transverse and longitudinal directions.

13. A label facestock, comprising the polyolefin single or multi-layer film of claim 1.

14. A method for labeling an article, comprising:
    applying a label to said article, wherein said label comprises the polyolefin single or multi-layer film of claim 1.

15. The polyolefin single or multi-layer film of claim 1, wherein said core layer comprises a blend of PP homopolymer and a PP/PE random biopolymer.

16. The polyolefin single or multi-layer film of claim 1, wherein said core layer comprises a blend of a PP/PE random bipolymer and a PP/PE block biopolymer.

* * * * *